(12) United States Patent
Perrut et al.

(10) Patent No.: US 6,800,316 B1
(45) Date of Patent: Oct. 5, 2004

(54) METHOD FOR FRACTIONATING COOKING OIL

(76) Inventors: Michel Perrut, 25, rue de Santifontaine, 54005 Nancy (FR); Wieslaw Majewski, "Le Meridian", 4, terrasse des Voages, 54250 Laxou (FR)

( * ) Notice: Subject to any disclaimer, the term of this patent is extended or adjusted under 35 U.S.C. 154(b) by 97 days.

(21) Appl. No.: 10/009,718

(22) PCT Filed: Jun. 16, 2000

(86) PCT No.: PCT/FR00/01669
§ 371 (c)(1),
(2), (4) Date: Dec. 13, 2001

(87) PCT Pub. No.: WO00/78902
PCT Pub. Date: Dec. 28, 2000

(30) Foreign Application Priority Data

Jun. 18, 1999 (FR) .......................................... 99 07728

(51) Int. Cl.[7] ................................................ A23D 9/02
(52) U.S. Cl. ......................... 426/417; 554/11; 554/12; 554/13; 554/14; 426/426; 426/429; 426/478; 426/492
(58) Field of Search ...................... 554/11–14; 426/478, 426/492, 486, 417, 330, 6, 601, 607, 608, 425, 429

(56) References Cited

U.S. PATENT DOCUMENTS

| | | | |
|---|---|---|---|
| 4,493,854 A | * | 1/1985 | Friedrich et al. ........... 426/629 |
| 4,504,503 A | * | 3/1985 | Biernoth et al. ............ 426/312 |
| 4,511,508 A | * | 4/1985 | Vollbrecht et al. .......... 426/665 |
| 4,601,906 A | * | 7/1986 | Shindler ........................ 554/8 |
| 4,675,198 A | * | 6/1987 | Sevenants ................... 426/425 |
| 4,692,280 A | * | 9/1987 | Spinelli et al. ............. 554/205 |
| 5,011,594 A | * | 4/1991 | Haeffner et al. ............ 208/320 |
| 5,013,443 A | * | 5/1991 | Higashidate et al. ........ 554/184 |
| 5,739,364 A | * | 4/1998 | Franke ......................... 554/16 |
| 5,759,549 A | * | 6/1998 | Hiltunen et al. ............... 554/8 |
| 5,980,964 A | * | 11/1999 | Walters et al. .............. 426/417 |

OTHER PUBLICATIONS

Reverchon, E., 1994. JAOCS 71(9)1007.*
Goncalves, M. 1991. JAOCS 69(7)474.*
Ooi, C. K. 1996. JAOCS 71(2)231.*
Bondioli, P. 1991. JAOCS 69(5)477..*
Chrastil, J. 1982. J. Phys. Chem 86:3016.*
Nilsson, W. B. 1991. JAOCS 68(2)87.*
American Heritage Dictionary. 1982. Houghton Mifflin Company. p. 370.*

* cited by examiner

*Primary Examiner*—Carolyn Paden
(74) *Attorney, Agent, or Firm*—Dechert, LLP; John W. Ryan

(57) ABSTRACT

The invention concerns a method for fractionating cooking oil, in particular frying oil, using a solvent with supercritical pressure. The method is characterized in that it comprises steps which consist in: contacting, in a mixer, the cooking oil with the solvent with supercritical pressure; separating the resulting mixture into two phases in a decanter, namely a light phase and a heavy phase; decompressing the light phase and the heavy phase so as to recuperate the solvent, and the treated oil and the treatment residues respectively.

13 Claims, 1 Drawing Sheet

METHOD FOR FRACTIONATING COOKING OIL

BACKGROUND OF THE INVENTION

The present invention relates to an industrial method for fractionating mixtures of lipids with the aid of a solvent taken to supercritical pressure, i.e. a fluid in supercritical state or a subcritical liquid, with a view to obtaining, from used cooking oils, a refined oil, decoloured and deodorized, from which are removed products of oxidation and other products of degradation formed during use of these oils.

The consumption of fried food, particularly fried potatoes, has considerably increased in the majority of developed countries, with the development of new types of restauration and new industrially cooked foods. This has logically led to a considerable increase in the production of used frying oils. The latter represent a considerable volume of waste, amounting to hundreds of thousands of tons per year in Europe, constituting a very serious potential threat of pollution of surface water. As at the present time it cannot be envisaged to re-use them, they are generally destroyed by incineration and only their calorific power is possibly recuperated.

The present invention has for its object to propose a method for industrially treating these used cooking oils in order to obtain a refined oil capable of being used as food component for animals, particularly for poultry.

This refined oil must therefore be bereft of products likely to be detrimental to the health of the animals thus fed, and must, in addition, be obtained at a cost compatible with an industrial exploitation. Of course, this refined oil must not represent risks for the consumer of the meat of the animals thus fed either, or add unpleasant tastes to this meat. It is therefore essential to eliminate the products of degradation of the oil which are formed during cooking and in particular those which give the oil a dark, even black colour and a highly sickening characteristic odour, which characterize for example flying oils after prolonged use.

The method according to the invention will call upon a method of separation employing a fluid at supercritical pressure.

In effect, it is known that bodies are generally known in three states: solid, liquid and gaseous. One passes from one to the other by varying the temperature and/or the pressure. Now, there is a point beyond which one can pass from the liquid state to the vapour state without passing through a boiling, or, inversely, by a condensation, but continuously: this point is called the critical point.

Under these conditions, a fluid in a supercritical state is a fluid which is in a state characterized either by a pressure and temperature respectively higher than the critical pressure and temperature in the case of a pure body, or by a representative point (pressure, temperature) located beyond the envelope of the critical points represented on a diagram (pressure, temperature) in the case of a mixture. Such a fluid presents, for very numerous substances, a high solvent power incomparable to that observed for this same fluid when it is in the state of compressed gas. The same applies to so-called "sub-critical" liquids, i.e. which are in a state characterized either by a pressure higher than the critical pressure and by a temperature lower than the critical temperature in the case of a pure body, or by a pressure higher than the critical pressures and a temperature lower than the critical temperatures of the components in the case of a mixture.

The considerable and modulatable variations of the solvent power of these fluids are, moreover, used in numerous methods of extraction (solid/fluid), of fractionation (liquid/fluid), of analytic or preparative chromatography, of treatment of materials (ceramics, polymers). Chemical or biochemical reactions are also made in such solvents.

Among the different solvents which may be used under a supercritical pressure, carbon dioxide is particularly interesting due to its critical pressure of 7.4 MPa and its critical temperature of 31° C., which make of it a preferred solvent in numerous applications, all the more so as it does not present any toxicity and it is available in very large quantities at very low cost. As non-polar solvent, carbon dioxide taken to supercritical pressure sometimes has a co-solvent added thereto, constituted by a polar organic solvent which modifies the solvent power in noteworthy manner especially with respect to molecules presenting a certain polarity, ethanol often being used to that end.

One of the principal advantages of the methods in which a fluid at supercritical pressure is used as solvent resides in the ease of effecting separation between the solvent and the extracts and solutes collected, as has been described in numerous publications and, for certain important aspects of implementation, in French Patent FR-A-2 584 618. The interesting properties of these fluids are moreover used in solid-fluid extraction and liquid-fluid fractionation, as is described in the afore-mentioned document.

Fractionation of the lipids by a fluid at supercritical pressure has been described in the prior state of the art, and reference may be made to a recent work "Supercritical Fluid technology in Oil and Lipid Chemistry" edited by J. W. KING and G. R. LIST. For example, pure carbon dioxide has been used as solvent of glycerides in order to extract the oils of different natural sources such as oleaginous seeds. The operations of fractionating lipids with the aid of solvents at supercritical pressure often encounter serious difficulties in implementation, as the initial or resultant phases are often very pasty, which renders contact with the solvent fluid difficult and even impossible to effect. Certain devices for dealing with this problem have been described, such as for example a jet extractor system proposed by EGGERS E., WAGNER H., ("Proceedings of the Third International Symposium on Supercritical Fluids") in order to remove oil from a soja lecithin. However, this system comprises at the most only one theoretical stage and it is thus not possible to effect a fractionation of very similar compounds requiring a high number of theoretical plateaux generally employed on multi-staged columns with perforated plateaux or lining functioning in counter-current. This method proves to be high-performance; however, although it is well adapted to the treatment of high-quality oils of high price intended for dietetics or pharmacy, its cost price is often too high to ensure industrial purification of wastes such as cooking oils.

Another method of fractionating lipids has also been proposed, described in particular in U.S. Pat. No. 5,759,549, in which the mixture to be fractionated is adsorbed on a porous solid, from which the different components are successively extracted by a fluid at supercritical pressure whose solvent power and polarity are successively increased. This method, of which the concept has been used for several years, is known under the name of "extrography". It will be noted that this method may be carried out with a high selectivity, by combination of the selectivity of the adsorbent solid and of that of the solvent at supercritical pressure, but requires complex means and can be carried out only in batch mode, which involves very high operating costs.

SUMMARY OF THE INVENTION

The object of the present invention is to propose a method making it possible, for industrial production purposes, to effect fractionation of used cooking oils with a view to obtaining a refined oil and a residue representing a limited volume with respect to the feedstock, with the aid of a solvent taken to supercritical pressure, by using a very simple installation and inexpensive to carry out.

DETAILED DESCRIPTION OF THE INVENTION

Figure 1:
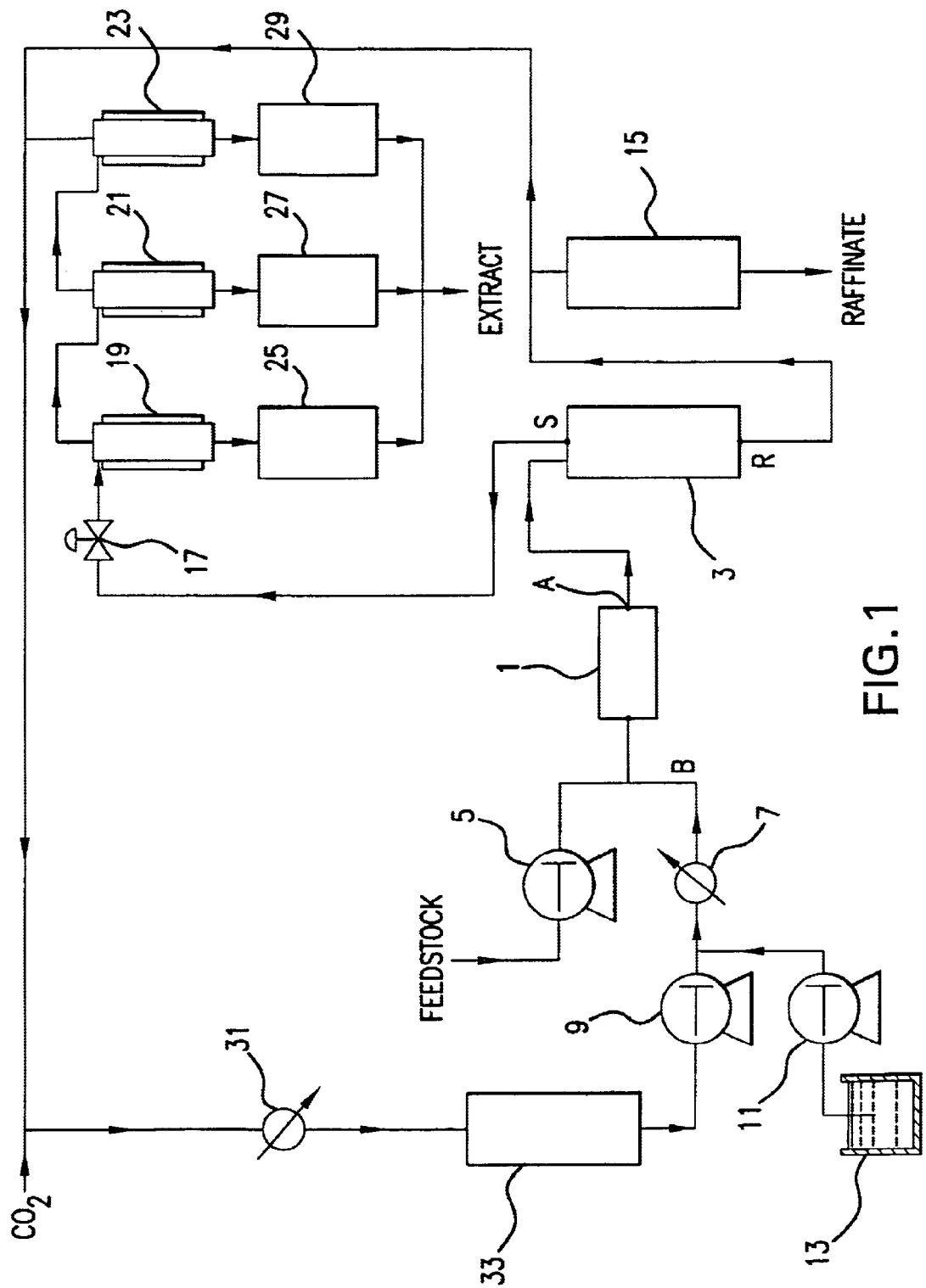
FIG. 1 shows an installation for carrying out the method according to the invention.

The present invention thus has for its object a method for fractionating a cooking oil, in particular frying oil, using a solvent at supercritical pressure, characterized in that it comprises the steps consisting in:

contacting, in a mixer, the cooking oil with the solvent at supercritical pressure;

separating the resulting mixture into two phases in a decanter, namely a light phase and heavy phase;

decompressing the light phase and the heavy phase so as to recuperate the solvent and the treated oil and the treatment residues respectively.

According to the invention, this fractionation is effected on an equipment consisting of an assembly of "mixer-decanter" type constituted by a mixer within which the oil to be treated and the solvent at supercritical pressure are intimately mixed, and by a decanter maintained at a pressure less than or equal to that prevailing in the mixer, within which the diphasic mixture thus produced is separated into its two phases, namely the heavy phase constituted by the non-extracted oil residue and a low concentration of solvent at supercritical pressure which is dissolved therein, and the light phase, constituted by the fluid at supercritical pressure and the components of the oil which are dissolved therein.

The heavy phase is advantageously recycled, partly in the mixer and partly decompressed to atmospheric pressure and constitutes the residue which is very dark with an unpleasant odour.

In an embodiment of the invention, the fluid at supercritical pressure is constituted by a mixture of an organic solvent in carbon dioxide. In this case, a small quantity of this organic solvent is still present in the residue after decompression of the heavy phase and will be separated, in a conventional evaporator for example, in order that the residue can be more easily manipulated and possibly destroyed, and that the organic solvent thus recuperated can be recycled. Such an organic solvent may be constituted in particular by a light hydrocarbon having between 2 and 5 carbon atoms, such as ethane, propane and butane. The operating pressure will be included between 7.4 PMa and 50 Mpa and more favourably between 20 MPa and 40 MPa, the temperature itself being included between 0° C. and 80° C. Such a solvent may also be constituted by an alcohol, such as in particular ethanol, or by a ketone, such as in particular acetone, or by an ester, such as in particular ethyl acetate.

The light phase is decompressed in order to effect separation of the solvent from the treated oil which constitutes the extract. It will be recalled that the prior state of the art proposes means for optimalizing the separation between the solvent and the extract, in particular thanks to the devices described in afore-mentioned French Patent FR-A-2 584 618. The extracted oil is thus bereft of the products of degradation resulting from the use of the initial oil as frying medium, in particular of those which give it a dark, even black colour and a highly sickening characteristic odour.

A form of embodiment of the present invention will be described hereinafter by way of non-limiting example, with reference to the accompanying drawing in which the single Figure schematically shows an installation for carrying out the method according to the invention.

This installation essentially comprises a mixer 1 of which the outlet A supplies a separator 3. The mixer 1 is constituted by a cylindrical recipient with a diameter of 58 mm and a height of 1 m which is filled with a lining of stainless steel of "Intalox" type 10 mm thick and which is provided with a double-jacket allowing the circulation of a heat-transfer fluid. The inlet B of the mixer 1 is connected to a volumetric diaphragm pump 5 which supplies the latter with cooking oil to be purified, after the latter has been taken to a sufficient temperature to give it a fluidity allowing it to be pumped. The inlet B of the mixer 1 is also connected to an exchanger 7 which is itself connected to two pumps, namely a volumetric diaphragm pump 9 which delivers the solvent, in the present case carbon dioxide, and a pump 11 of the same type which supplies a co-solvent, in the present case ethanol, which is contained in a tank 13. The pump 9 compresses the carbon dioxide to its supercritical pressure, and the exchanger 7 ensures heating of the solvent and the co-solvent. After mixture, the fluid admitted into the separator 3 is decanted therein and is maintained at a pressure close to or slightly less than that prevailing in the mixer 1.

The raffinate emerges at R at the foot of the separator 3, and is decompressed to the pressure of recycling of the fluid, viz. about 4.5 MPa, in a recipient 15 within which expansion takes place, at a pressure less than that prevailing in the separator 3, which allows degassing of the liquid and the partial recycling of the vaporized solvent. The solvent laden with extract emerges at the head S of the separator 3, and is decompressed via a valve 17 of discharge type. The drop in pressure brings about separation of the mixture which is admitted into an assembly of separators 19, 21, 23 constituted, in accordance with the system described in afore-mentioned French Patent FR-A-2 584 618, by cyclone chambers allowing the total separation of the liquid phase and the gaseous phase with addition of heat via the walls of the separators of which the double-jacket has hot water passing therethrough, which makes it possible to bring the enthalpy required to ensure vaporization of the solvent.

The liquid phase collected in the separators 19, 21, 23 is drawn off, at atmospheric pressure, via a system of lock chambers 25, 27, 29 respectively. The solvent from which the extract and part of the co-solvent has been removed is liquefied in a double-tube condenser 31 of which the outer tube has passing therethrough a mixture of water-ethylene glycol cooled towards 0° C., stored in the liquid state at about 5° C. in a tank 33 of which the level is maintained stable by an addition of carbon dioxide from an outside tank and which is connected to pump 9.

As the method requires a high flowrate of oil in order to improve the contact between the oil and the fluid at supercritical pressure, it will be noted that it is useful to recycle part of the raffinate in the feedstock in order to increase the yield of extraction in valorizable compounds.

EXAMPLE 1

Treatment of a used frying oil in a mixer-decanter:

In such an installation, a mixture of frying oils collected from different users, mainly from restaurants cooking fried potatoes, has been treated. This oil is in the form of a viscous product, of very dark brown colour and exhaling a characteristic sickening odour such as may be encountered in certain poorly ventilated restaurant kitchens.

Its composition is not known precisely, but it is constituted by a mixture of fats of vegetable origin: sunflower, rape-seed and peanut oils and partially hydrogenated palm oil. In order to render it easy to pump, it was disposed in a recipient heated to 60° C. It was then injected by the pump 5 into the installation described previously and was mixed in the mixer 1 with a flow of fluid at supercritical pressure constituted by carbon dioxide furnished by the pump 5, with an addition of a co-solvent constituted by ethanol furnished by pump 11 under the following conditions:

flowrate of frying oil to be treated: 4 kg/hr.

flowrate of carbon dioxide: 41.3 kg/hr.

flowrate of ethanol: 3 kg/hr.

Pressure in the mixer 1 and the separator 3: 25 MPa

Temperature in the mixer 1 and the separator 3: 50° C.

Pressure in the separators 19, 21, 23 after expansion of the fluid: 4.5 MPa

Under these conditions, an extract is obtained at the outlet of the lock chambers 25, 27, 29, which, after elimination of the ethanol entrained in a rotary evaporator in vacuo, is in the form of a yellow-orange oil, limpid and virtually odourfree.

On the contrary, the residue is in the form of a dark brown viscous liquid with an odour even more sickening than that of the initial oil. Over a period of two hours, 8 kg of used oil were injected and 2.8 kg of refined oil and 5.2 kg of residue were collected.

EXAMPLE 2

Treatment of a used flying oil in a mixer-decanter with partial recycling of the residue:

The procedure is the same as in the case of the preceding Example. However, the temperature in the mixer 1 is taken to 70° C. and it is no longer the crude used oil alone which is treated, but about 96% of the residue is recycled, the flowrate of the injected oil being taken to 28 kg/hr.

Under these conditions, the extract obtained after elimination of the ethanol is in the form of an oil which is slightly more orange-coloured than the one obtained previously, but still limpid and virtually odourless. The appearance of the residue is similar to that obtained earlier. Over a period of eight hours, 18 kg of used oil were treated and 10.4 kg of refined oil and 7.6 kg of residue were collected.

It will therefore be understood that the partial recycling of the residue allows a substantial increase in the final yield of extraction of the refined oil with respect to the initial oil, which therefore attains 58% instead of 35% in the case described in the preceding example.

What is claimed is:

1. Method for fractionating a cooking oil, using a solvent at supercritical pressure, characterized in that it comprises the steps consisting of:

contacting, in a mixer, the cooking oil with the solvent at supercritical pressure;

separating the resulting mixture into two phases in a decanter, namely a light phase and heavy phase;

decompressing the light phase and the heavy phase so as to recuperate the solvent and the treated oil and the treatment residues respectively.

2. Method according to claim 1, characterized in that the solvent at supercritical pressure is constituted by carbon dioxide.

3. Method according to claim 2, characterized in that the solvent at supercritical pressure is constituted by mixture of an organic solvent in carbon dioxide at a pressure included between 7.4 MPa and 50 Mpa, and at a temperature included between 0° C. and 80° C.

4. Method according to claim 3, characterized in that the organic solvent is a light hydrocarbon having between 2 and 5 carbon atoms, such as ethane, propane and butane.

5. Method according to claim 3, characterized in that the organic solvent is an alcohol.

6. Method according to claim 5, wherein the alcohol is ethanol.

7. Method according to claim 3, characterized in that the organic solvent is a ketone.

8. Method according to claim 7, wherein the ketone is acetone.

9. Method according to claim 3, characterized in that the organic solvent is an ester.

10. Method according to claim 9, wherein the ester is ethyl acetate.

11. Method according to any one of the preceding Claims, characterized in that the heavy phase is recycled in part with the initial feedstock constituted by the cooking oil to be treated.

12. Method according to claim 3, wherein the pressure is between 20 MPa and 40 MPA.

13. Method according to claim 1, wherein the cooking oil is a frying oil.

* * * * *